Fig. 1.

Fig. 2.

United States Patent Office
3,326,652
Patented June 20, 1967

3,326,652
APPARATUS AND PROCESS FOR REFINING
GLASS AND FOR CONTINUOUSLY MANU-
FACTURING SHEET GLASS
Emile Plumat, Gilly, Belgium, assignor to Glaverbel,
Brussels, Belgium, a Belgian company
Filed Sept. 4, 1963, Ser. No. 306,555
Claims priority, application Luxembourg, Sept. 29, 1962,
42,439
7 Claims. (Cl. 65—99)

The present invention relates to a process for refining glass and for the continuous manufacture of sheet glass, the surface quality of which is comparable to that obtained by "fire polishing."

Various processes have already been proposed for the continuous manufacture of sheets having such a surface quality, particularly by causing a ribbon of plastic glass to advance on or through a bath of molten metal, such as tin or a tin and copper alloy, which was already recommended at the start of the century for this purpose.

In all these processes, before reaching the molten metal bath, the glass in molten form is refined in the refining compartment of the traditional furnaces, with all the disadvantages which this operation involves. Because of the large volume of the refining compartment, the glass remains therein for a relatively long time, during which its prolonged contact with the refractory ceramic materials causes a dissolution of the latter, while the long exposure of the glass surface to the furnace atmosphere favours the volatilisation of the soda which is contained therein. In addition, it is necessary to use a large quantity of heating energy in order to reach the lower layers of the glass bath in which is set up a considerable vertical temperature gradient. This temperature gradient obviously corresponds to an inverse vertical viscosity gradient, so that the speed of ascent of the bubbles is smaller as they are at a greater depth.

After refining, the glass is introduced in the form of a plastic ribbon or strip into a surface-treatment compartment containing a molten metal bath, on which or through which the glass ribbon is caused to pass. During its formation, and before it enters the treatment compartment or as it is introduced into the latter, the plastic glass ribbon loses some of the qualities acquired by the refining, for example, by contact with formation members. It may thus comprise defects which its degree of viscosity on entering the compartment no longer permits to be eliminated.

The process according to the invention obviates these disadvantages.

According to the invention, glass in the rough molten state is withdrawn from a melting furnace before the refining has been able to progress to a substantial degree, this glass is spread out on a flat and horizontal surface in a thin liquid layer having approximately the thickness of the sheet which is to be obtained, this layer is caused to advance while keeping it at a high temperature capable of permitting a rapid refining of the glass, it is then caused to pass through a progressive cooling zone and the solidified glass ribbon is caused to enter an annealing furnace.

This process enables the glass quantity to be kept in a molten state to be substantially reduced, with the result of obtaining a greatly improved thermal balacne. Furthermore, the period of contact of the molten glass with the refractory ceramic materials is shorter, as is also the period of exposure of the surface of the glass to the furnace atmosphere, so that the glass composition is subjected to fewer undesirable modifications than during the conventional refining in a tank furnace. Another advantage of the process according to the invention is that it only requires a melting furnace of reduced dimensions, the latter being without the part usually reserved for the refining zone. The process also makes it possible for the glass to be eloborated in a vertical tank furnace without a refining chamber, which occupies a smaller area than the traditional tank furnaces while having an identical capacity.

In order to spread out the glass on the horizontal surface, the simplest procedure is to cause the glass to flow in a thin layer over a weir or overflow provided at the outlet from the furnace. The glass, having substantially the temperature acquired in the melting furnace, is very fluid and is spread easily on the horizontal surface, which it covers completely in a layer of uniform thickness, preferably slightly thicker than that of the glass ribbon to be obtained. The layer is maintained by the inflow of glass from the furnace in order to compensate for the flow of the refined glass towards the solidifying zone, this flow being regulated by a traction which is exerted in known manner at the outlet from the solidifying zone on the ribbon of solidified glass, which is still sufficiently maleable in order to be introduced into the annealing zone.

In the refining zone, the glass is first of all kept at a temperature at which it is quickly refined. This maintaining of the temperature is assisted by the reflection of the thermal radiation to the glass-support interface and in addition assisted, where necessary, either by the hot gases of the melting furnace penetrating into the refining zone, or by heating means which can be provided in this zone and act directly on the glass layer and, in certain cases, also on the material forming the support of the horizontal surface. It is to be noted that this supply of heat does not normally serve for reheating the glass layer at the start of its passage on the horizontal surface, but only for maintaining the temperature of this layer, so that this supplementary heat supply is relatively unimportant and that the temperature curve of the glass from its departure from the furnace first of all shows a practically horizontal line while the refining is carried out, is then inflected towards the outlet of the refining zone and further into the solidifying zone wtihout showing a reverse slope, as is the case in the processes in which a strip of previously formed glass having solidified surfaces is treated on the molten metal bath. The process according to the invention thus makes economical use of the thermal energy expended for the elaboration of the glass, the quantity of said energy being already reduced by eliminating the refining zone of the tradiational glass furnaces.

Because of its small thickness, the layer has the same reduced viscosity everywhere in vertical section and of the order of less than $10^4$ poises, this favouring the rapid ascent of the gas bubbles, so that the refining is easily carried out in a very short time during a small travel on the horizontal surface. The glass layer can for this reason progress rapidly on the said surface, and thermal convection currents or zones of stagnant glass, as well as transverse or vertical temperature gradients, have no opportunity of being established.

The solidifying zone, in which the glass layer must be solidified in order to constitute a ribbon which is still sufficiently malleable in order to be taken up at the outlet from this zone by a roller-type conveyor, may be designed in any suitable manner, provided it is capable of cooling the glass at the required speed so that it quickly leaves the temperature zone known as the devitrification zone. In the solidifying zone, the glass is preferably supported by a molten metal bath in order to impart the fire polish appearance to its surfaces. The molten metal bath must be at the same level as the horizontal surface of the refining zone and may be of the same width as or have a greater width than the horizontal surface of the refining zone. In the first case, the solidifying zone must be provided with means for preventing the adherence of the solidified glass to the longitudinal walls of the tank containing the molten metal bath, but this latter will be protected against oxidation by the glass ribbon which completely covers it, whereas in the second case, this zone must comprise means for guiding the glass strip as well as others for protecting those lateral portions of the surface of the molten metal bath which are not covered by the glass ribbon against oxidation.

The arrangement for carrying out the process according to the invention comprises a flat and horizontal metal surface in the refining zone for the glass which is in a thin layer.

In a first embodiment, this metal surface is formed by a metal sheet supported by a base of refractory ceramic material. This metal sheet is preferably raised along the longitudinal edges of the surface so as to form a channel in which the glass layer is displaced during the refining thereof. This metal sheet is made of a metal which is heat-resistant and also resistant to attack by the glass, advantageously molybdenum.

In other embodiments, the metal surface is formed by that of a molten metal bath contained in a tank made of refractory ceramic material. This bath is advantageously formed of molten silver, or an alloy containing silver, for example an alloy with copper or with tin, but it may also be formed of tin or of an alloy, for example, of tin with copper or lead.

When tin or tin alloy is used as molten metal bath, the bath preferably extends over the full length of the two refining and solidifying zones, but when a molten silver or silver alloy bath is used, this bath can only extend over the refining zone and must be followed in the solidifying zone by a bath consisting of a metal having a lower melting point, such as tin or a tin alloy. These two baths can be contained in a single tank and separated from one another by a transverse partition reaching almost to the surface of the baths. The use of such a partition is also to be recommended when employing molten tin or an alloy of this metal in the refining zone, the heat conditions of the molten metal bath in this zone being very different from those of the solidifying zone. The tank containing the bath of molten metal is advantageously lined internally with a sheet of a metal which is heat-resistant and does not react with the molten metal or with the glass, such as molybdenum, in order to avoid losses of molten metal by infiltration into the mass of ceramic material of the tank.

The space situated above the flat metal surface preferably comprises a screen which separates the glass refining zone from the solidifying zone. This screen, which extends down until in proximity with the layer of glass, contributes to making the heat conditions of the refining zone independent of the conditions of the solidifying zone.

Embodiments of the invention are shown by way of example in the accompanying drawing.

Figures 1, 2:
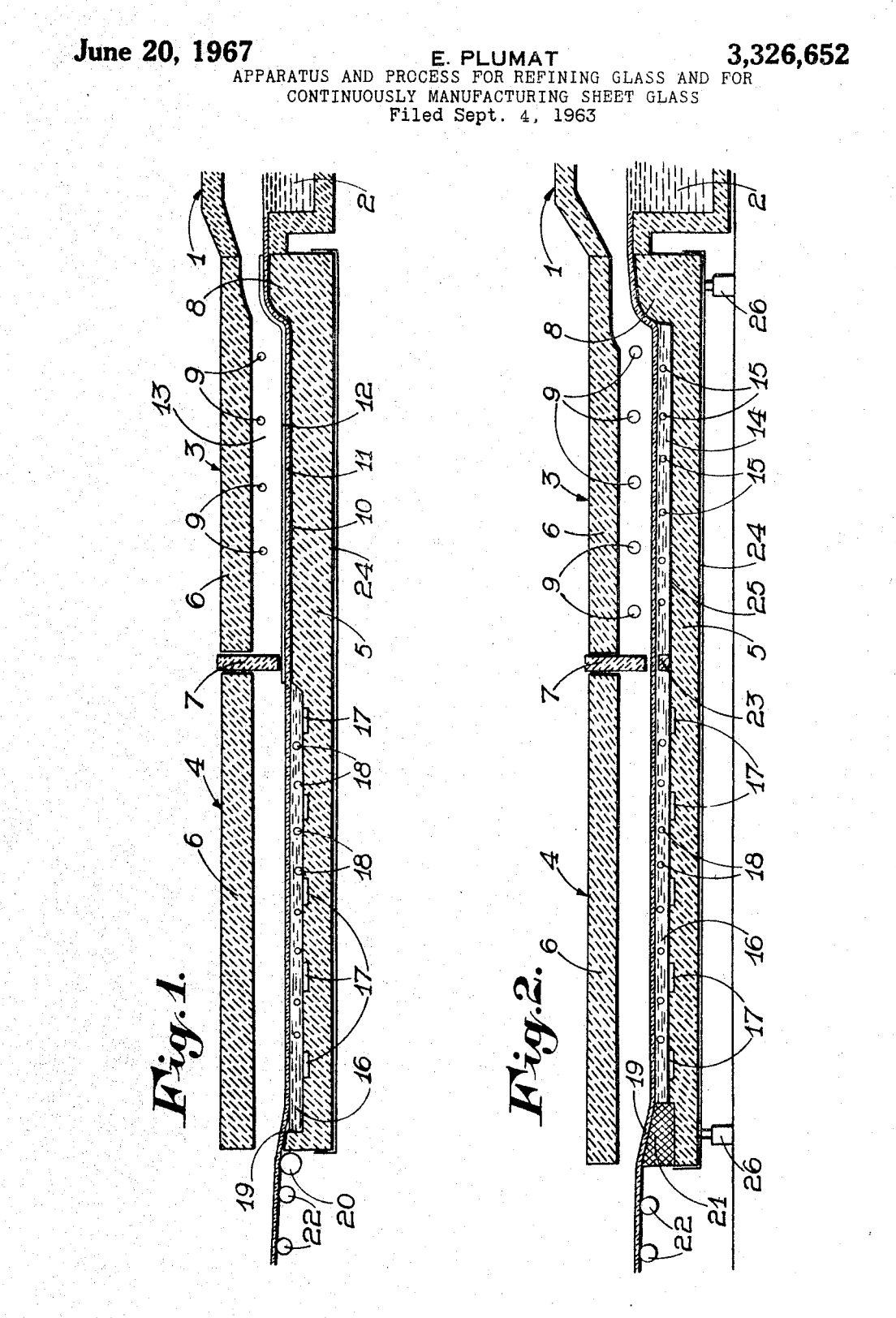

FIG. 1 is a diagrammatic vertical longitudinal section of an arrangement comprising a refining zone of the glass in a thin layer and FIG. 2 shows a similar but modified arrangement.

In the two figures, the reference 1 represents the outlet passage or extension of a glass elaboration furnace containing glass 2 in a rough molten state, that is to say, glass which has not been subjected to refining and having for example been elaborated in a vertical tank furnace, in which the molten mass has simply been separated from the material still undergoing melting by a barrier or by an adequate siphon, or glass having only undergone commencement of refining, for example in a tank furnace not provided with a refining zone proper.

The refining zone 3 and the solidifying zone 4 comprise a common base 5 and arch 6 of refractory ceramic material and are separated from one another by a screen 7, separating the atmosphere of the refining zone from that of the solidifying zone.

The refining zone 3 is connected to the outlet of the outlet passage or extension 1 by a weir or overflow 8, and it is provided with heating means, such as burners 9.

In the embodiment according to FIGURE 1, the base 5 is covered in the refining zone 3 with a sheet 10 of a heat-resistant metal which is neutral with respect to the glass being melted, this metal advantageously being molybdenum. This sheet 10 forms the flat and horizontal surface on which the melting glass can be spread out in a thin layer 11 in order there to undergo the refining. The metal sheet also covers the ramp of the weir 8 and preferably also the parts 12 of the longitudinal walls 13 which are liable to come into contact with the molten glass, so as to constitute a metal channel protecting the molten glass from any contact with the refractory ceramic material. The metal sheet 10 extends into the solidifying zone 4 by extending slightly beyond the screen 7.

In the embodiment shown in FIGURE 2, the base 5 constitutes a tank containing a molten metal bath 14 capable of being kept at the required temperature by heating means 15 embedded in the bath. The latter is formed by a metal or an alloy having a melting point which is at a temperature lower than that which the glass 11 must have in order to be able to undergo a rapid and complete refining. Metals such as silver or tin are suitable for this purpose, and also alloys of silver with copper or tin, or alloys of tin with copper or lead.

The solidifying zone 4 comprises in both embodiments a molten metal bath 16 provided with cooling means 17 and heating means 18, the effect of which is combined so as progressively to cool the glass. The surface of the molten metal bath 16 is at the level of the flat surface of the refining zone 3, and thus at the level of the sheet 10 (FIG. 1) or the molten metal bath 14 (FIG. 2). At the outlet, the solidifying zone is provided with means for lifting the glass ribbon 19 from the bath 16, for example a roller 20 (FIG. 1) or a ramp 21 (FIG. 2) of a material which does not mark the glass, or another known means for raising the ribbon 19 to the level of the rollers 22 of the annealing furnace. It also comprises means known per se for guiding the glass ribbon undergoing solidification and for preventing the solidified margins of the ribbon from adhering to the longitudial walls of the tank containing the metal bath 16.

When the arrangement comprises molten metal baths in the two zones 3 and 4 (FIG. 2), these baths are separated from one another by a transverse barrier 23 reaching almost to the level of the baths. This barrier is provided when the two baths are formed of different metals, but its presence is indicated also in the case where the two baths contain the same metal, for example tin or a tin alloy, the heat conditions of these baths being different from one another.

In order to avoid losses of molten metal, the base 5 can be lined externally with a metal sheet 24 (FIGS. 1 and 2) or even the tank containing the molten metal baths 14 and 16 (FIG. 2) as well as the ramp of the weir 8 can be covered with a sheet 25 of a metal which is heat-resistant and does not react either with the molten glass or with the molten metals of the bath. The entire base 5 can be placed on jacks 26 (FIG. 2), for the purpose of adjusting the horizontal position of the arrangement.

In accordance with the invention, the rough molten glass, almost at the temperature acquired in the melting tank, is caused to flow in a thin layer over the weir 8 onto the flat and horizontal metal surface formed either by the face of the solid metal layer 10 (FIG. 1) or by that of the molten metal bath 14. The very fluid glass is spread over the metal surface in a layer, the thickness of which is kept slightly greater than the desired thickness of the solidified glass ribbon, in order to allow for the drawing which the glass must undergo during the operations. During its travel on the metal surface from the zone 3 towards the zone 4, the refining of the thin layer of very hot glass is easily effected and is completed before the glass layer reaches the zone 4, in which the solidification is carried out by a progressive cooling, during which the glass ribbon travels through the temperature zone which gives the fire polish appearance to the surfaces thereof.

It is obvious that the invention is not limited to the embodiments which have been described and illustrated by way of example and it would not constitute any departure from the scope thereof by incorporating modifications.

I claim:

1. A method of continuously manufacturing glass in sheet form, comprising the steps of melting glass material to provide a bath of the crude molten glass in liquid form, flowing the crude molten glass in liquid form directly from such bath thereof onto a flat, substantially horizontal surface to cause the liquid glass to form a thin liquid layer having approximately the thickness of the sheet to be made and completely covering such horizontal surface, flowing the liquid glass material at a given rate in the form of such thin liquid layer on such surface through a refining zone and toward a solidifying zone while applying sufficient heat to the liquid glass in such layer to maintain it at a high temperature, thereby enabling the rapid refinement thereof before reaching said solidifying zone, directly passing the layer of fluid glass emerging from the refining zone through a solidifying zone having a horizontal glass supporting surface that will support the glass layer at substantially the same level as said refining zone surface, and in said solidifying zone progressively cooling the refined glass material in such layer as it passes therethrough and at a rate to establish a cohesive layer capable of being withdrawn therefrom, and then annealing the refined, cooled glass material in such layer.

2. Apparatus for continuously manufacturing glass in sheet form, comprising a furnace for melting glass material to provide therein a liquid bath of crude molten glass for forming the glass sheet and having an outlet for the discharge of the crude molten glass from such liquid bath thereof, means forming an elongated refining zone and having a flat, substantially horizontal, layer supporting metal surface extending throughout its length, said refining zone means having an inlet adjacent to said outlet of the glass melting means, conduit means extending from said furnace outlet to said refining zone inlet to enable the crude molten glass to flow directly from the furnace to said supporting metal surface so as to form on such surface a thin liquid layer having approximately the thickness of the sheet to be made and completely covering said surface, said conduit means being open above the flowing glass to permit the furnace heat to heat the crude molten glass as it flows thereon from said furnace outlet to said refining zone inlet, means controlling the flow of the liquid glass in the form of such layer through such zone at a given rate, means for applying sufficient heat to the liquid glass in such layer to maintain it at a high temperature enabling the rapid refinement thereof during its flow through such zone, means forming an elongated solidifying zone having a horizontal glass supporting surface capable of supporting the glass layer at substantially the same level as said refining zone surface and abutting the discharge end of the latter at its inlet end, thereby forming an extension of said refining zone surface and enabling the layer of liquid glass emerging from the refining zone to enter without change into said solidifying zone, means in said solidifying zone for progressively cooling the refined glass material in such layer at a rate to establish a cohesive layer capable of being withdrawn therefrom, said controlling means comprising means adjacent to the outlet of said solidifying zone for drawing the cooled layer from said solidifying zone.

3. Apparatus as defined in claim 2, in which the base of said refining zone is constituted of refractory ceramic material, and said metal surface is formed by a metal sheet supported by said base.

4. Apparatus as defined in claim 3, in which the longitudinal side edges of said metal sheet are disposed transversely to the horizontal surface formed by the body of said sheet to form a metal channel for the thin liquid layer passing through said refining zone.

5. Apparatus as defined in claim 4, in which said conduit means comprises a weir having a ramp surface extending from said furnace outlet and through said refining zone inlet to said horizontal surface, said metal sheet covering said ramp surface.

6. Apparatus as defined in claim 2, in which said refining zone means comprises an elongated tank made of refractory ceramic material and containing a bath of molten metal, the surface of said metal bath constituting the layer supporting metal surface of said refining zone over which the liquid glass flows.

7. Apparatus as defined in claim 2, in which said metal surface in said refining zone is formed by a metal sheet, and in which said metal surface in said solidifying zone is formed by the surface of a bath of molten metal, the liquid glass flowing from said metal sheet onto said bath surface.

References Cited

UNITED STATES PATENTS

| 2,754,559 | 7/1956 | Fromson | 65—65 |
| 2,928,212 | 3/1960 | Long | 65—374 X |
| 3,157,482 | 11/1964 | Nero et al. | 65—374 X |
| 3,201,219 | 8/1965 | Frazier et al. | 65—335 X |
| 3,241,939 | 3/1966 | Michalik | 65—65 |

DONALL H. SYLVESTER, *Primary Examiner.*

S. LEON BASHORE, *Examiner.*

A. D. KELLOGG, *Assistant Examiner.*